J. R. CARTER.
MANIFOLD COPYING BOOK.
No. 10,359. Reissued July 24, 1883.
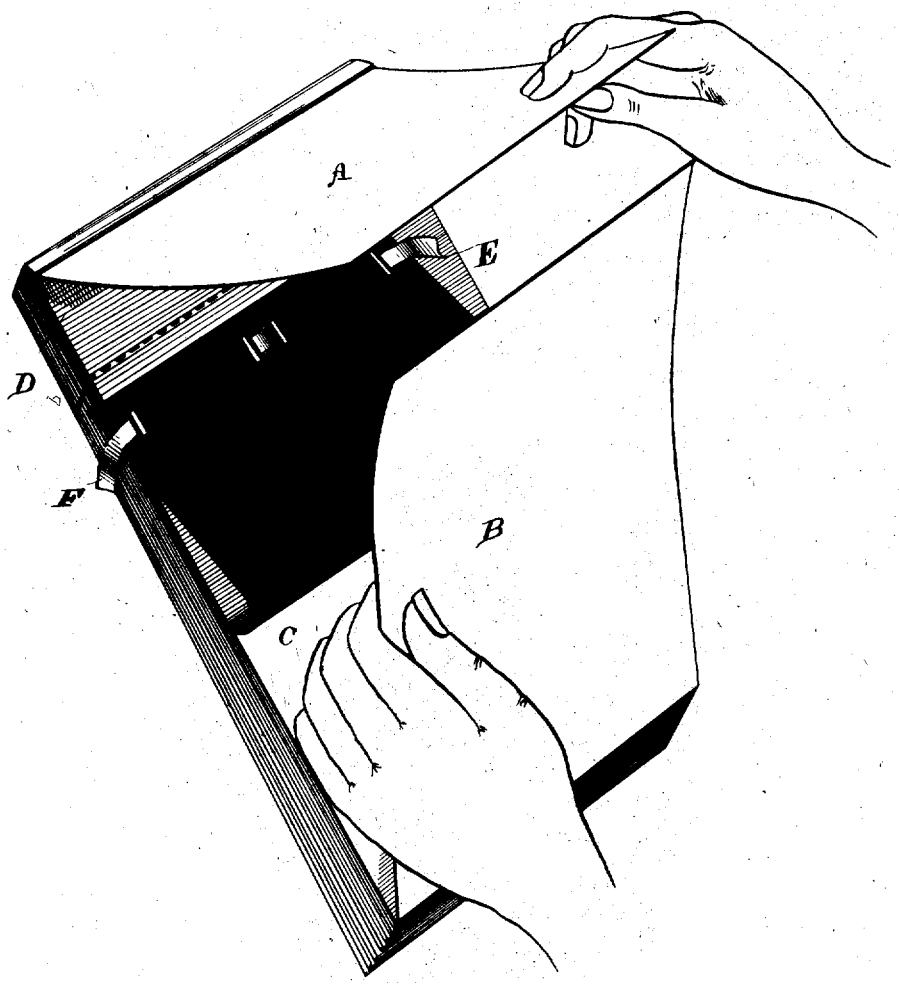
WITNESSES.
W. F. Walling.
W. C. Gates
INVENTOR.
John R. Carter
per Warwick & Bartlett
His attorneys.

UNITED STATES PATENT OFFICE.

JOHN R. CARTER, OF TORONTO, ONTARIO, CANADA.

MANIFOLD COPYING-BOOK.

SPECIFICATION forming part of Reissued Letters Patent No. 10,359, dated July 24, 1883.

Original No. 252,646, dated January 24, 1882. Application for reissue filed May 17, 1883.

*To all whom it may concern:*

Be it known that I, JOHN R. CARTER, a subject of the Queen of Great Britain, residing at Toronto, in the Province of Ontario and Dominion of Canada, have invented certain new and useful Improvements in Manifold Copying-Books, of which the following is a specification, reference being had to the accompanying drawing.

The object of the invention is to provide a check-book in which the black or transfer leaf used for transferring writing from one page to another need not be handled and will not have a tendency to curl up after a number of leaves have been torn out; and it consists, essentially, of a black-leaf check-book composed of double leaves, one half of which are bound together, while the other half are folded in as fly-leaves, both being perforated across, so that they can be readily torn out, the black leaf being bound into the book next to the cover and provided with a tape bound across its end, the said black leaf having the transferring composition on one of its sides only.

The drawing represents my black-leaf check-book, the cover being held open by one hand, the fly leaf being raised by another, and the black leaf folded back, so as to show the transferring composition on its bottom side.

A is the cover of the book.

B is a fly-leaf attached to or forming part of the leaf C. The leaves B and C are separated by perforations running across the crease. Similar perforations running across the leaves C near the binding enable the latter leaf to be torn out, leaving only a stub, D.

E is the black leaf, bound with the other leaves, but next to the cover A. This leaf has a transferring composition on its under side only, and is provided with a tape, F, bound across its lower end, as shown. This tape enables the black leaf to be folded back or raised without soiling the fingers. When the book is about to be used, the black leaf E is laid flat upon the face of the leaf C, the transferring composition on the under side of the leaf E resting on the face of the leaf C. The leaf B is then allowed to rest on top of the black leaf E, and when the necessary memorandum is written upon the leaf B it is transferred onto the leaf C. The leaf B may then be torn from the leaf C and the latter leaf removed from the stub. A double leaf, corresponding with B and C, will then be exposed, and the operation repeated as described.

It will be seen that a book made in this manner will be less bulky than if all the leaves were bound into the stub, and there would be less likelihood of the black leaf becoming crumpled up than if it were placed in the center and the leaves removed from the stub on either side.

I am aware that black leaves are used in other forms of books used in transferring writing from one page to another; but they are either loose in the book, and are therefore easily lost and are dirty to handle, or are placed in the center of the book and the leaves numbered on either side of it, which latter arrangement is faulty, from the fact that the space left on each side of the black leaf, when the leaves are torn out, causes the black leaf to curl up and become unsatisfactory in its operation.

What I claim is—

1. A transfer-leaf book composed of folded leaves bound together at one edge, with a leaf coated with transferring composition bound in the book, said transfer-leaf being of such length as to be inclosed in the folded leaf, substantially as described.

2. A transfer-leaf check-book composed of folded leaves secured at one edge, perforated, as described, and having a leaf of transfer-paper bound therein, said leaf being of such length as to be inclosed in the folded leaves, substantially as described.

3. A black-leaf check-book composed of double leaves, one half of which are bound together, while the other half fold in as fly-leaves, both being perforated across, so that they can readily be torn out and the black leaf bound into the book next the cover, and provided with the tape secured across its end, the said black leaf having the transferring composition on one of its sides only.

In testimony whereof I affix my signature in presence of two witnesses.

JOHN R. CARTER.

Witnesses:

W. A. BARTLETT,

J. H. WARWICK.